3,063,188
BOBBER WITH FLOAT CONTROLLED LINE
Marion W. Turner, 705 E. 2nd Ave. NE.,
Puyallup, Wash.
Filed Feb. 17, 1961, Ser. No. 89,979
4 Claims. (Cl. 43—43.11)

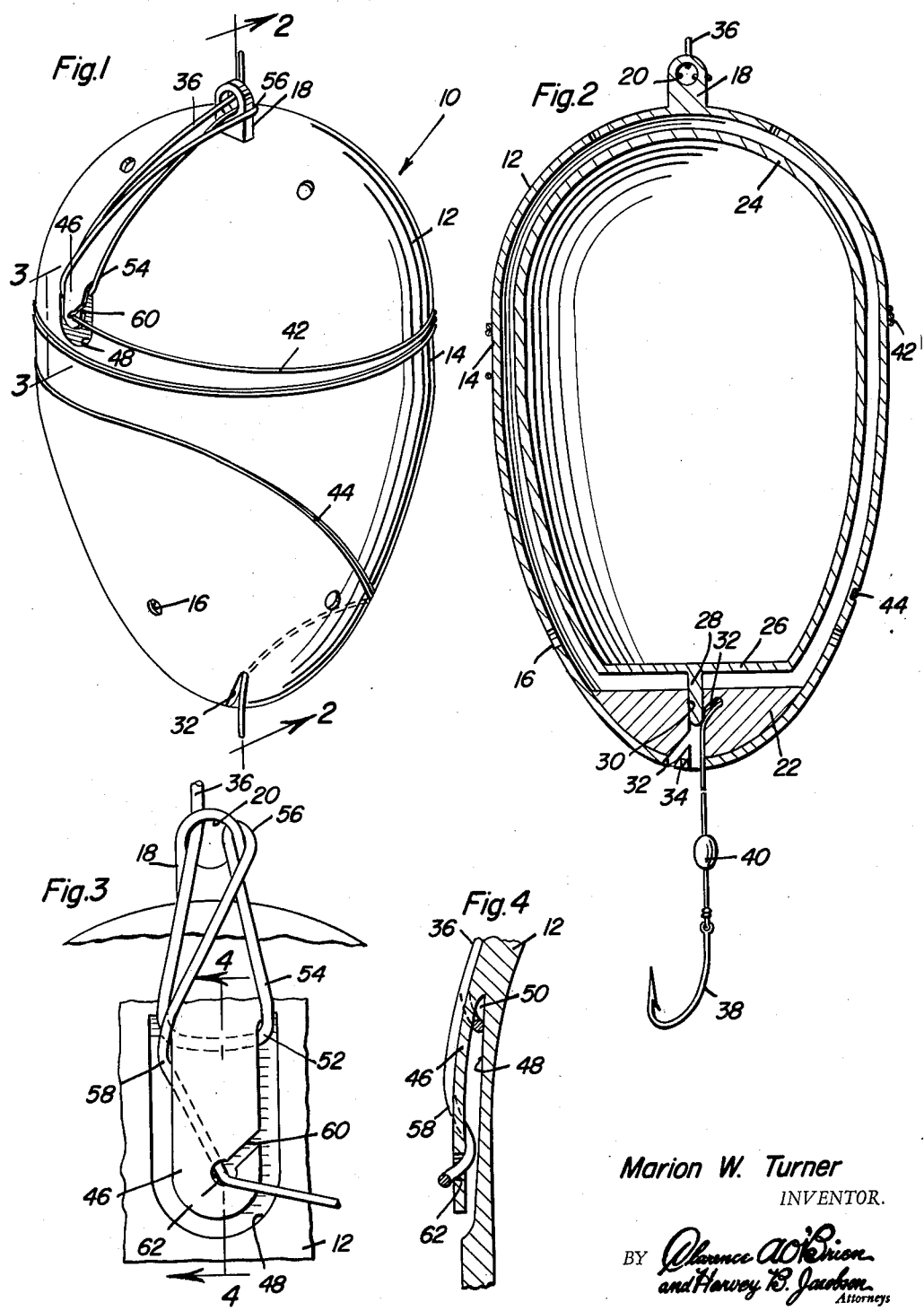

The present invention generally relates to a fishing device and more particularly to a bobber having a portion of line stored thereon together with a float controlled release device in order to release the stored line when the bobber is disposed in the water whereby a fishing hook may be disposed at a predetermined depth in the water for optimum fishing conditions.

The primary object of the present invention is to provide a bobber which is quite simple in construction, easy to employ, fool-proof in operation and generally inexpensive to manufacture.

Another object of the present invention is to provide a bobber including a hollow body with a float disposed therein together with means for receiving a portion of the fishing line such as the leader, the float including means releasably retaining the leader wound on the hollow body so that the entire assembly may be easily cast to a desired position in a body of water after which the float will release the leader when the bobber is disposed in the water so that the stored portion of the leader may be released and payed out thus enabling the hook attached to the leader to be disposed at the desired depth for orientating the hook in the area which the fish supposedly occupies.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the bobber of the present invention;

FIGURE 2 is a vertical sectional view taken substantially upon a plane passing along section line 2—2 of FIGURE 1 illustrating the details of construction of the bobber;

FIGURE 3 is an enlarged fragmental side elevational view on an enlarged scale with portions omitted illustrating the structure for attaching the line to the bobber; and FIGURE 4 is a detailed sectional view taken substantially upon a plane passing along section line 4—4 of FIGURE 3 illustrating further structural details of this portion of the invention.

Referring now specifically to the drawings, the numeral 10 generally designates the bobber of the present invention which may be considered a simplified and improved form of the structure disclosed in prior Patent No. 2,807,-115 issued September 24, 1957.

The bobber 10 of the present invention includes a hollow body 12 which is substantially oval-shaped in configuration but with the upper end being slightly larger and more bulbous than the lower end. As illustrated in FIGURE 2, the longitudinal cross-sectional configuration of the body 12 quite closely approaches the shape of an egg but a central portion of the body 12 is cylindrical as designated by numeral 14. The surface of the body 12 is provided with a plurality of spaced apertures 16 therein so that water may have access to the interior of the body 12. At the top end of the body 12 there is provided an upstanding eye or lug 18 having an opening 20 therein. At the bottom end of the hollow body 12, there is provided a weight 22 in the form of a metallic insert or in the form of thickened area for retaining the hollow body 12 disposed generally vertically with the lug 18 uppermost when the hollow body 12 is disposed in water. The body 12 may be constructed of any suitable material such as plastic, metal or wood and the lug 18 may be integral therewith as may be the weight 22 or the weight 22 may be a metallic insert such as a lead weight.

Disposed interiorly of the hollow body 12 is a hollow float 24 which is of similar configuration to the body 12 but spaced concentrically therefrom whereby the float 24 may move in relation to the body 12. The float 24 is hollow and is floatable so that when water enters the opening 16 and engages the float 24, it will cause the float 24 to move upwardly in relation to the body 12. Normally, the float 24 rests upon the upper surface of the weight 22 and is provided with generally flat bottom 26 for engaging the weight 22 and limiting the downward movement of the float 24.

The bottom of the float 24 is provided with a depending pin 28 slidable in a vertical bore 30 extending through the weight 22 and also through the bottom end of the body 12. Also, the lower edge portion of the body 12 as well as the weight 22 is provided with an inclined or diagonal groove or slot 32 which extends inwardly in intersecting relation to the vertical bore 30. At the bottom of the body 12, the weight 22 is provided with a lateral portion 34 which actually defines the vertical or longitudinal bore 30 and the inclined slot 32 for a purpose described hereinafter.

The bobber 10 is adapted to be associated with a fishing line such as a leader 36 having a fish hook 38 and sinker weight 40 on one end thereof. A portion of the leader 36 is wound upon the cylindrical portion 14 of the body 12 and is connected thereto. FIGURE 1 illustrates a plurality of windings or coils 42 of the leader 36 and the lowermost coil extends downwardly and is received in the spiral groove 44 formed in the lower surface of the exterior of the body 12. The lower end of the groove 44 terminates at one end edge of the transverse diagonal slot 32 and the leader 36 extends down through the groove 44 and inwardly through the slot 32 wherein it is held in the upper end of the slot 32 by the pin 28 when in its lowermost position. In other words, the pin 28 forms a latch or trigger mechanism for retaining the leader in the upper end of the slot 32 until such time as the float 24 is moved upwardly thus releasing the leader 36 from the slot 32 by virtue of the pin 28 moving upwardly above the upper limit of the slot 32 where it intersects the longitudinal bore 30. Upward movement of the float 24 is caused by the device being supported in the water. This will enable the leader to unwind from the groove 44 and also enable the coil 42 to unwind. By varying the number of coils 42 wound upon the cylindrical portion 14, the depth to which the hook 38 will sink may be readily determined.

The bobber is attached to the leader 36 by virtue of the leader 36 extending downwardly through the opening 20 and the lug 18 and then under a lug 46 which overlies a generally U-shaped recess 48 as illustrated specifically in FIGURE 4. The upper end of the lug 46 curves inwardly as indicated by numeral 50 to provide frictional engagement with the bight portion 52 of the loop 54 formed in the leader 36 as it is passed under the lug 46. The end of the loop 54 is then returned through the opening 20 in the form of a loop 56 and then extends back downwardly and is passed around one edge of the lug 46 as at 58. The opposite edge of the lug 46 is provided with an inclined, open keyhole-shaped guide slot 60 having a circular inner end 62 which receives the leader 36 and the portion of the leader 36 passes back out through the circular opening 62 and then is wound around the cylindrical portion 14 in the form of coils 42. When it is desired to adjust the position of the bobber on the leader 36, it is only necessary to release the leader from the opening 62 by moving it through the slot 60 after which the loops 56 and 54 may be loosened and the bobber moved to any desired position on the leader 36 thereby enabling the number of coils 42 to be varied thereby varying the depth to which the hook 38 will sink when it is released by upward movement of the float in relation to the body 12 such as will occur when the body 12 is cast onto the surface of the water when the body 12 will tend to sink into the water thus causing the surrounding water to pass in through the opening 16 and cause the float 24 to move upwardly in relation to the body 12 thereby releasing the leader and at the same time floatingly supporting the body 12 in a predetermined condition on the surface of the water, that is, the body 12 will be partially submerged and partially disposed above the water level so that when the body 12 will operate normally as a visual float.

As will be clearly apparent, the bobber of the present invention enables a fisherman to dispose his hook at a predetermined depth and permits easier casting of the apparatus since excessive leader is wound upon the bobber thus causing less possible entanglements.

In actual practice, the fisherman takes the line in hand at the depth he wishes to fish and doubles the line upon itself and sticks it through the opening 20 and the bight portion is then placed under the lug or clip 46 thus forming the assembly before the leader is engaged with the aperture 62 or under the lug at point 58. The portion of the leader below the opening 20 and extending toward the fish hook is then placed under the lug or clip 46 at point 58 and in the slot 60 thus enabling the leader to pass through the opening 62. The excessive leader portion is then hand wound upon the bobber and the lower end is spiralled down by way of the groove 44 and the bobber is then turned with the top downward thus causing the float 24 to drop so that the keeper pin 28 is removed from intersecting relation to the diagonal slot 32. The leader is then placed in the slot and the bobber is then returned to its normal position so that the float 24 will drop thus locking the leader in this position with the keeper pin intersecting the slot 32 and retaining the leader in the upper end of the slot. In adjusting the position of the bobber on the line, it is only necessary to remove the leader from the slot 60 thus reducing the friction sufficiently since only the one U-shaped loop will be formed in the leader 36 since the leader will be removed from the slot 60 and away from the clip or lug 46 at point 58 thereby enabling the bobber to be longitudinally adjusted on the leader.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. A fishing bobber comprising a hollow body having a plurality of openings therein for admitting water, a hollow float disposed in said body, means at the upper end of the body for connection to a fishing line, the central portion of said body having a cylindrical area for receiving a plurality of windings of a fishing line, there being means at the lower end of the body receiving the outer end portion of the fishing line, and means on said float releasably retaining the outer end portion of the fishing line connected with the lower end of the body thereby retaining the coils of line on the body until the body is disposed on a water surface whereby the water will cause the float to move in relation to the body thereby releasing the means retaining the outer end of the line whereby the line may be unwound from the body and a hook attached to the line disposed at a depth, said means for connecting the body to a line including an upstanding apertured lug at the upper end of the body, a downwardly facing resilient, integral clip on the peripheral surface of the body in spaced relation to the lug whereby a portion of the line may be doubled and inserted through the lug and engaged under the clip, said clip being disposed adjacent the cylindrical portion of the body and cooperable therewith for wedgingly receiving and frictionally gripping the line therebetween, said clip including means engaging a portion of the line forming a continuation of the doubled portion thereby orientating the line in aligned relation to the cylindrical portion for winding thereon, the last-named means including an open keyhole-shaped slot in the clip for slidably receiving the line.

2. The structure as defined in claim 1 wherein said body is provided with a spiral groove leading from the cylindrical portion to the lower end thereof for receiving the line.

3. The structure as defined in claim 2 wherein said means receiving the line includes a transverse inclined slot in the lower end of the body communicating with the groove, and a longitudinal bore in the lower end of the body intersecting said slot, said means on said float including a depending lock pin slidable in the bore and intersecting the inclined slot whereby the pin will retain the line in the inner end of the inclined slot until the float is moved upwardly thereby retracting the locking pin and permitting release of the line from the slot.

4. The structure as defined in claim 3 wherein said body and float are generally oval-shaped in configuration and provided with a larger upper end, said float being concentrically spaced from the body for limited relative movement in relation thereto.

References Cited in the file of this patent
UNITED STATES PATENTS

| | | |
|---|---|---|
| 2,535,907 | Dolejs | Dec. 26, 1950 |
| 2,720,720 | Landrum | Oct. 18, 1955 |
| 2,807,115 | Turner | Sept. 24, 1957 |
| 2,829,464 | Pettit et al. | Apr. 8, 1958 |
| 2,909,865 | Ehlert | Oct. 27, 1959 |
| 2,966,000 | Kmiecik | Dec. 27, 1960 |